(12) United States Patent
Kojima (10) Patent No.: US 8,364,441 B2
(45) Date of Patent: Jan. 29, 2013

(54) SURFACE TEXTURE MEASURING DEVICE, SURFACE TEXTURE MEASURING METHOD, AND PROGRAM

(75) Inventor: Tsukasa Kojima, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 389 days.

(21) Appl. No.: 12/662,618

(22) Filed: Apr. 26, 2010

(65) Prior Publication Data

US 2010/0286961 A1 Nov. 11, 2010

(30) Foreign Application Priority Data

May 8, 2009 (JP) .................... 2009-113789

(51) Int. Cl.
*G06F 17/40* (2006.01)
(52) U.S. Cl. .................................................. 702/184
(58) Field of Classification Search ............ 702/184, 702/182, 183, 185
See application file for complete search history.

(56) References Cited

U.S. PATENT DOCUMENTS

| 2002/0183964 A1 | 12/2002 | Handa et al. |
| 2003/0019119 A1 | 1/2003 | Sato et al. |
| 2004/0107073 A1 | 6/2004 | Sakurada et al. |
| 2008/0065341 A1 | 3/2008 | Ishikawa et al. |
| 2008/0295571 A1* | 12/2008 | Takahama et al. ............ 73/1.89 |

FOREIGN PATENT DOCUMENTS

JP  A-2002-357415  12/2002

OTHER PUBLICATIONS

European Search Report dated Jul. 2, 2010 in European Patent Application No. 10 16 2219.9.

* cited by examiner

*Primary Examiner* — Edward Raymond
(74) *Attorney, Agent, or Firm* — Oliff & Berridge, PLC (57) ABSTRACT

Surface texture measuring device includes: first pseudo measurement point sequence obtaining means which drives contact piece to trace a surface of reference workpiece having reference shape and obtains locus of certain position of the contact piece as first pseudo measurement point sequence; contact piece model calculating means which calculates, based on first pseudo measurement point sequence and design surface specifying the reference workpiece surface, a contact piece model representing surface shape of the contact piece and placed in pseudo space; second pseudo measurement point sequence obtaining means which places contact piece model such that its surface contacts a reference surface specifying a workpiece surface and it takes the same posture as contact piece in measurement, and calculates reference position of the contact piece model as second pseudo measurement point sequence; and replacement determination means which determines whether to replace contact piece based on second pseudo measurement point sequence.

18 Claims, 10 Drawing Sheets

REFERENCE WORKPIECE 4A
(IRREGULR PLANE SURFACE)

REFERENCE WORKPIECE 4B
(HEMISPHERE)

CASE WHERE INITIAL CONTACT PIECE
MODEL M0 EATS INTO DESIGN SURFACE S0a

FIG. 18

CASE WHERE INITIAL CONTACT PIECE
MODEL M0 IS AWAY FROM DESIGN SURFACE S0a

US 8,364,441 B2

SURFACE TEXTURE MEASURING DEVICE, SURFACE TEXTURE MEASURING METHOD, AND PROGRAM

CROSS REFERENCE TO RELATED APPLICATIONS

This application is based on and claims the benefit of priority from prior Japanese Patent Application No. 2009-113789, filed on May 8, 2009, the entire contents of which are incorporated herein by reference.

BACKGROUND OF THE INVENTION

1. Field of the Invention

The present invention relates to a surface texture measuring device such as a coordinate measuring machine which measures displacement using a contact piece, a surface texture measuring method, and a program.

2. Description of the Related Art

In a contact measurement system using a contact probe (a contact piece), it is necessary to inspect any deformation (wear, damage, etc.) of the shape of the tip of the contact piece in use. In inspecting deformation of the shape of the tip of the contact piece, there are the following two methods. In the first method, the tip of the contact piece is inspected by microscopic observation. In the second method, a certain reference workpiece is measured and the result of the measurement is used for inspection. At present, however, measurement is often carried out in an environment in which a microscope cannot be used, and the second method is used instead for inspection.

A detailed explanation of the second method will now be given. First, the measuring device brings the contact piece into contact with a reference workpiece, moves the contact piece along the reference workpiece, and thereby acquires a pseudo measurement point sequence. A pseudo measurement point sequence is a sequence of discrete points sampled from a locus of the center point of the contact piece obtained during a measurement. Pseudo measurement point sequence is described in, e.g., JP2002-357415A.

Next, the measuring device calculates a certain roughness parameter (evaluation value) from the pseudo measurement point sequence and determines whether or not to replace the contact piece based on the roughness parameter (replacement determination). Specifically, replacement determination is executed based on comparison between the certain roughness parameter at present and a nominal value. The nominal value represents the certain roughness parameter obtained when measurement is carried out using an un-deformed contact piece. When there is a great difference between the roughness parameter obtained from the measurement of the reference workpiece and the nominal value, it is determined that the contact piece should be replaced because it is deformed. In some cases, replacement determination is executed based on comparison between the certain roughness parameter at present and the certain roughness parameter in the past. Furthermore, there is a proposal for improvement of inspection accuracy based on measuring a reference workpiece sensitive to change of the shape of the contact piece and a reference workpiece insensitive to such change, and using the ratio between their roughness parameters as an evaluation value. In this way, conventional replacement determination is made based on a certain roughness parameter obtained by measuring a reference workpiece by a contact piece.

However, the amount by which the roughness parameter changes along with deformation of the contact piece fluctuates depending on the surface texture of the workpiece to be measured for obtaining the roughness parameter. Therefore, in the conventional replacement determination, even when the amount of change of the certain roughness parameter obtained by measuring a reference workpiece is equal to or smaller than a specified value (i.e., even when determination is made against necessity of replacement), an evaluation value based on the roughness parameter obtained by measuring an actual measurement target workpiece might not satisfy a criterial value. That is, conventional replacement determination cannot accurately specify such deformation of the contact piece that would affect measurement of an actual measurement target workpiece, and hence cannot correctly determine whether or not to replace the contact piece.

SUMMARY OF THE INVENTION

A surface texture measuring device according to the present invention includes: a contact piece having a tip capable of contacting with a workpiece; first pseudo measurement point sequence obtaining means operative to drive the contact piece such that the contact piece traces a surface of a reference workpiece having a reference shape, and obtain a locus of a certain position of the contact piece as a first pseudo measurement point sequence; contact piece model calculating means operative to calculate, based on the first pseudo measurement point sequence and a design surface specifying the surface of the reference workpiece, a contact piece model representing a surface shape of the contact piece and placed in a pseudo space; second pseudo measurement point sequence obtaining means operative to place the contact piece model such that a surface of the contact piece model contacts a reference surface specifying a surface of the workpiece and that the contact piece model takes a same posture as that taken by the contact piece during a measurement, and calculate a reference position of the contact piece model as a second pseudo measurement point sequence; and replacement determination means operative to determine whether or not to replace the contact piece based on the second pseudo measurement point sequence.

A surface texture measuring method according to the present invention is a surface texture measuring method involving use of a contact piece having a tip capable of contacting with a workpiece, and includes: driving the contact piece such that the contact piece traces a surface of a reference workpiece having a reference shape, and obtaining a locus of a certain position of the contact piece as a first pseudo measurement point sequence; calculating, based on the first pseudo measurement point sequence and a design surface specifying the surface of the reference workpiece, a contact piece model indicating a surface shape of the contact piece and placed in a pseudo space; placing the contact piece model such that a surface of the contact piece model contacts a reference surface specifying a surface of the workpiece and that the contact piece model takes a same posture as that taken by the contact piece during a measurement, and calculating a reference position of the contact piece model as a second pseudo measurement point sequence; and determining whether or not to replace the contact piece based on the second pseudo measurement point sequence.

A surface texture measuring program according to the present invention is a surface texture measuring program involving use of a contact piece having a tip capable of contacting with a workpiece, and controls a computer to: drive the contact piece such that the contact piece traces a surface of a reference workpiece having a reference shape, and obtain a locus of a certain position of the contact piece as a first pseudo measurement point sequence; calculate, based on the first pseudo measurement point sequence and a design surface specifying the surface of the reference workpiece, a contact piece model indicating a surface shape of the contact piece and placed in a pseudo space; place the contact piece model such that a surface of the contact piece model contacts a reference surface specifying a surface of the workpiece and that the contact piece model takes a same posture as that taken by the contact piece during a measurement, and calculate a reference position of the contact piece model as a second pseudo measurement point sequence; and determine whether or not to replace the contact piece based on the second pseudo measurement point sequence.

DETAILED DESCRIPTION OF THE EMBODIMENTS

Next, the embodiments of the present invention will be explained with reference to the drawings.

First Embodiment

Configuration of Surface Texture Measuring Device According to First Embodiment

Figure 1:
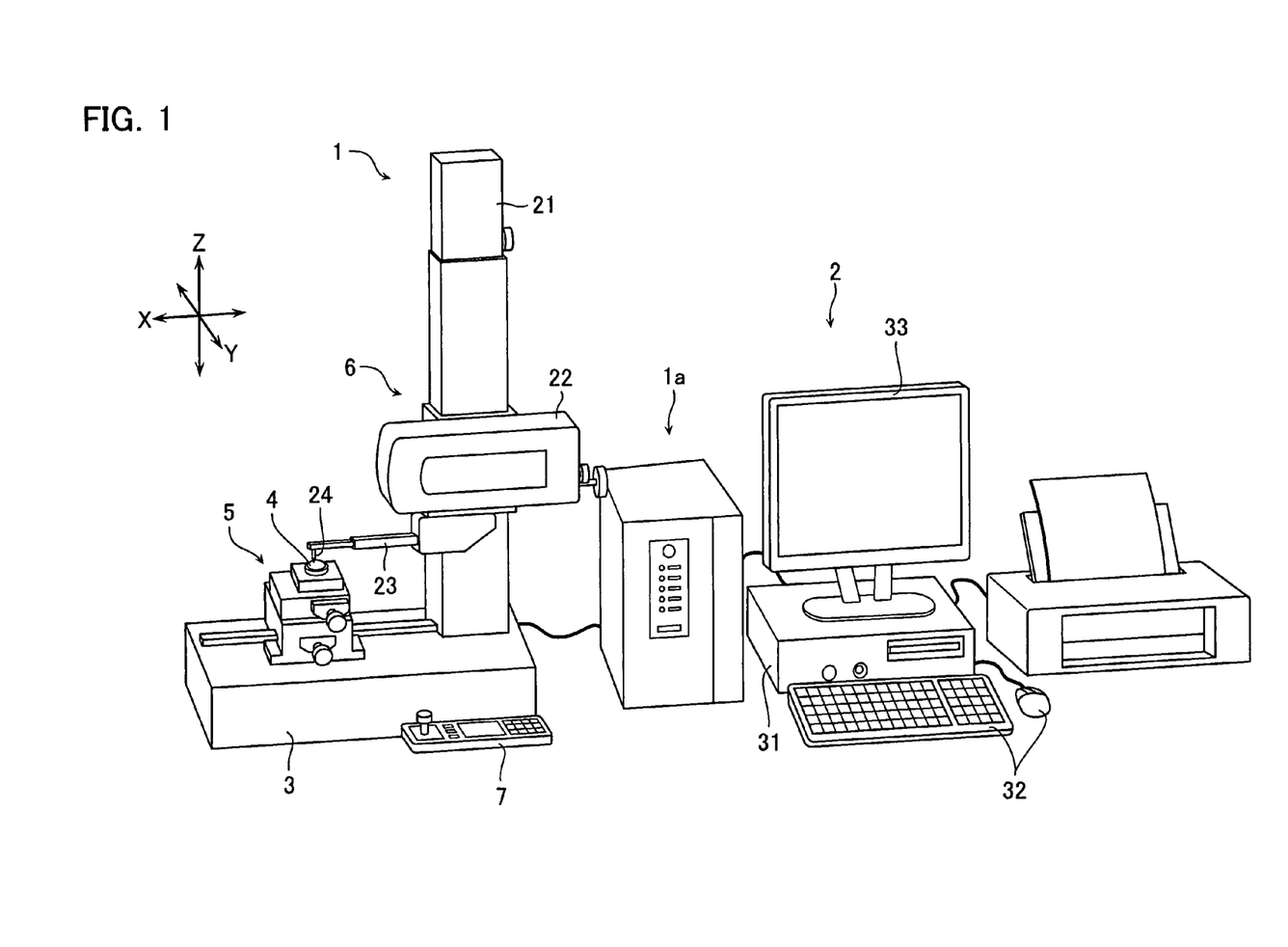
FIG. 1 is an appearance perspective diagram showing a schematic configuration of a surface texture measuring device according to a first embodiment of the present invention.

First, with reference to FIG. 1, the configuration of a surface texture measuring device according to the first embodiment will be explained. The surface texture measuring device includes a measuring unit 1, and an arithmetic processing device 2 connected to the measuring unit 1 via a drive control unit 1$a$. The measuring unit 1 includes a base mount 3, a table 5 provided on the base mount 3 and on which a workpiece 4 is placed, a displacement detecting unit 6 configured to detect any displacement of the surface of the workpiece 4 placed on the table 5, and an operation section 7 used for operating them. The table 5 can be moved on the base mount 3 in the X-axis direction of the drawing (left-right direction) and the Y-axis direction of the drawing (the direction perpendicular to the drawing sheet). The table 5 has an inclination adjusting function that can adjust the surface of the workpiece 4 that faces the table 5 to an arbitrary posture.

The displacement detecting unit 6 is constructed as follows. A column 21 that extends upward stands on the base mount 3, and a slider 22 is mounted on the column 21 in a way to be able to move up and down. A stylus 23 is attached to the slider 22. The stylus 23 can be driven in the horizontal (X-axis) and vertical (Z-axis) directions, and has a contact piece 24 at the end. That is, the stylus 23 can be moved relative to the table 5. The contact piece 24 can bring its tip into contact with the workpiece.

While the slider 22 and the stylus 23 are moved relative to the table 5, the contact piece 24 is operated to trace the surface of the workpiece 4 placed on the table 5, whereby the height Z of the surface at each X-direction position is obtained as a first pseudo measurement point sequence P1$i$. Note that the column 21, the slider 22, and the stylus 23 constitute a contact piece driving means that drives the contact piece 24.

Figure 2:
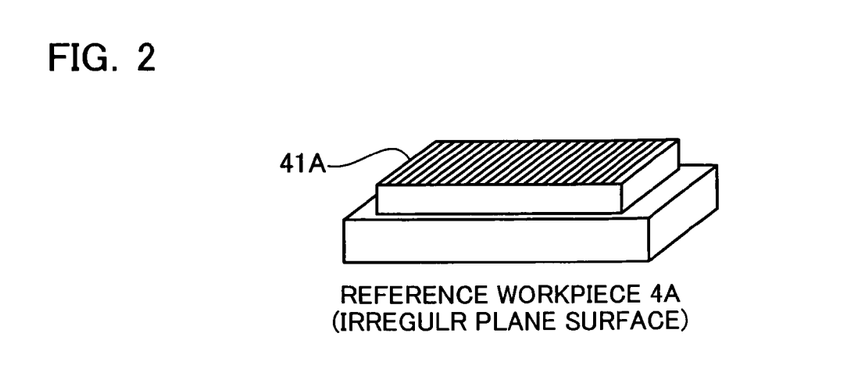
FIG. 2 is a perspective diagram showing a reference workpiece 4A in the first embodiment.

Other than the workpiece 4, a reference workpiece 4A shown in FIG. 2 is placed on the table 5 of the measuring unit 1. The reference workpiece 4A has a known shape (reference shape), and is used for generating a contact piece model M1. The contact piece model M1 is information that is placed in a pseudo space and represents the surface shape of the contact piece 24. As shown in FIG. 2, the surface 41A of the reference workpiece 4A has irregularities in a certain direction at a certain pitch.

The arithmetic processing device 2 acquires the first pseudo measurement point sequence P1$i$ obtained by the displacement detecting unit 6. The arithmetic processing device 2 includes an arithmetic processing unit 31 configured to execute arithmetic processing, an operation section 32, and a display screen 33.

Figure 3:
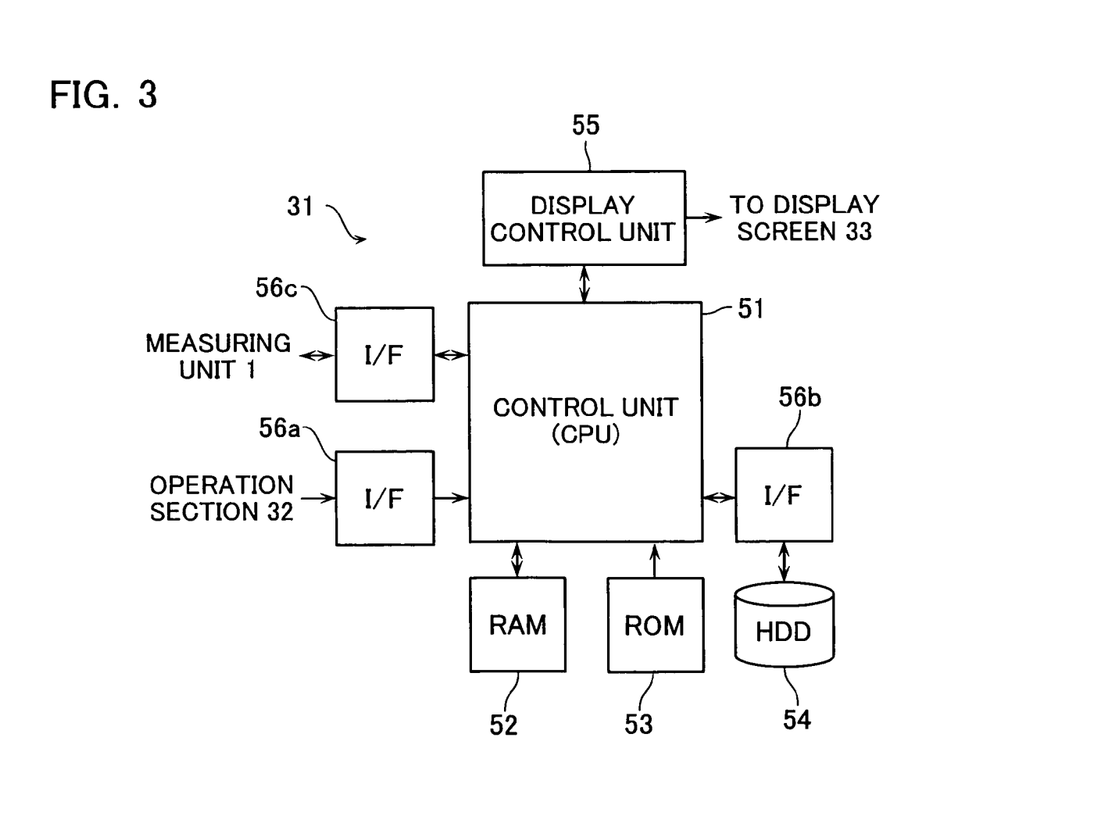
FIG. 3 is a block diagram showing the configuration of an arithmetic processing unit 31 of the surface texture measuring device according to the first embodiment.

Next, with reference to FIG. 3, the configuration of the arithmetic processing unit 31 will be explained. As shown in FIG. 3, the arithmetic processing unit 31 mainly includes a control unit (CPU: Central Processing Unit) 51, a RAM (Random Access Memory) 52, a ROM (Read Only Memory) 53, an HDD (Hard Disk Drive) 54, and a display control unit 55. In the arithmetic processing unit 31, code information and positional information entered from the operation section 32 are input to the control unit 51 via an I/F 56$a$. The control unit 51 executes various processes in accordance with a macro program stored in the ROM 53 and various programs that are loaded onto the RAM 52 from the HDD 54 via an I/F 56$b$.

The control unit 51 controls the measuring unit 1 via an I/F 56$c$ in accordance with a measurement execution procedure. The control unit 51 displays a measurement result, etc. on the display screen 33 via the display control unit 55. The control unit 51 reads out various programs from the HDD 54 and executes a later-described operation shown in FIG. 4 by executing the programs. The control unit 51 controls the contact piece 24 to move. The control unit 51 controls the contact piece 24 to be driven to trace the surface of the workpiece 4 or the reference workpiece 4A. The RAM 52 stores various programs and provides a work area for various processes. The HDD 54 is a recording medium that stores various control programs.

Operation of Surface Texture Measuring Device According to First Embodiment

Figure 4:
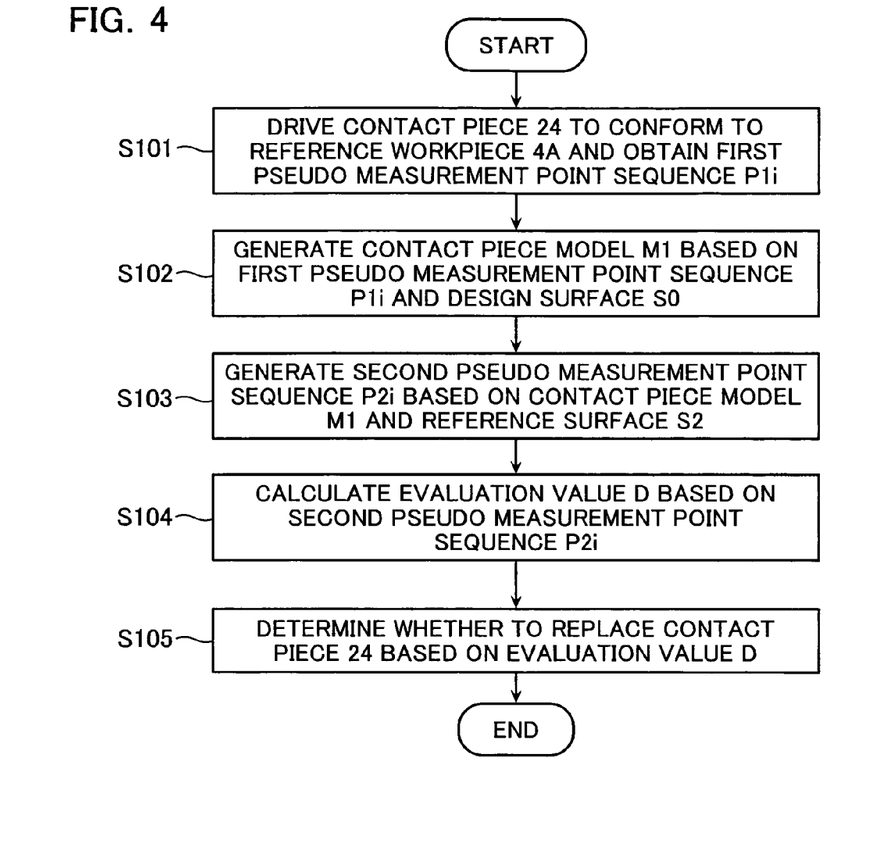
FIG. 4 is a flowchart showing an operation of the surface texture measuring device according to the first embodiment.

Next, with reference to FIG. 4, an operation of the surface texture measuring device according to the first embodiment will be explained. First, as shown in FIG. 4, the control unit 51 controls the contact piece 24 to be driven to trace the reference workpiece 4A, and obtains a locus of a certain position, e.g., a center position O of the contact piece 24 as a first pseudo measurement point sequence P1$i$ which is discrete (step S101).

Then, the control unit 51 generates a contact piece model M1 based on the first pseudo measurement point sequence P1$i$, and a design surface S0 that specifies the surface 41A of the reference workpiece 4A (step S102).

Figure 5:
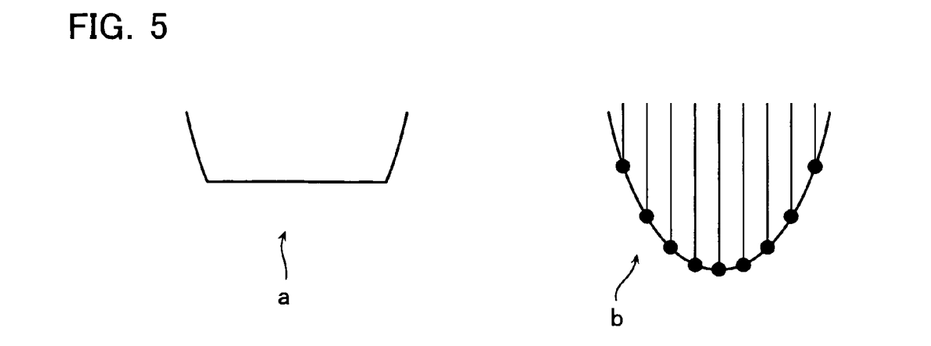
FIG. 5 is a diagram showing "a simplified model" and "a detailed model".

Though will be explained in detail later, a method for generating a contact piece model M1 may be, for example, a method of using "a simplified model" as shown in FIG. 5 ($a$), which is a planar approximation of a deformation given to the tip of a sphere, or a method of using "a detailed model" as shown in FIG. 5 ($b$), which is a detailed discrete representation of a tip shape, or the like. If a three-dimensional shape of the contact piece 24 is necessary, the contact piece 24 or the table 5 may be constructed to be able to rotate and a known reference hemisphere may be used as a reference workpiece, so that a first pseudo measurement point sequence P1$i$ can be obtained for each rotational position of the criteria hemisphere and the contact piece 24 relative to each other. Then, a two-dimensional model of the contact piece 24 may be calculated based on the first pseudo measurement point sequence P1$i$ obtained at each rotational position. Then, the two-dimensional models of the contact piece 24 calculated for the respective rotational positions may be combined to calculate a three-dimensional contact piece model M1.

Next, the control unit 51 generates a second pseudo measurement point sequence P2$i$ based on the contact piece model M1 and a reference surface S2 that specifies the surface of the workpiece 4 (step S103). Specifically, the control unit 51 places the contact piece model M1 such that the surface of the contact piece model M1 contacts the reference surface S2 and that the contact piece model M1 takes the same posture as that that is taken by the contact piece 24 during a measurement, and calculates a reference position of the contact piece model M1 as a second pseudo measurement point sequence P2$i$. The reference surface S2 represents a pre-stored typical surface texture (e.g., a turned surface, a ground surface, a honed surface, etc.). The reference surface S2 may alternatively be composed of measurement values obtained when the workpiece 4 was measured in the past.

Subsequent to step S103, the control unit 51 calculates an evaluation value D based on the second pseudo measurement point sequence P2$i$ (step S104). The evaluation value D is a roughness parameter unique to the reference surface S2. The control unit 51 executes replacement determination of determining whether or not to replace the contact piece 24 based on the evaluation value D (step S105).

In step S105, the control unit 51 compares "the evaluation value D described above" and "an evaluation value D0 based on a contact piece model generated based on a nominal value". Alternatively, the control unit 51 compares "the evaluation value D described above" and "an evaluation value D0 based on a contact piece model generated before the evaluation value D is generated". Specifically, the control unit 51 executes replacement determination based on whether or not "a determination value F" expressed by the following (Equation 1) falls within a tolerable range.

$$F=100\times((D-D0)/D0) \tag{Equation 1}$$

Figure 6:
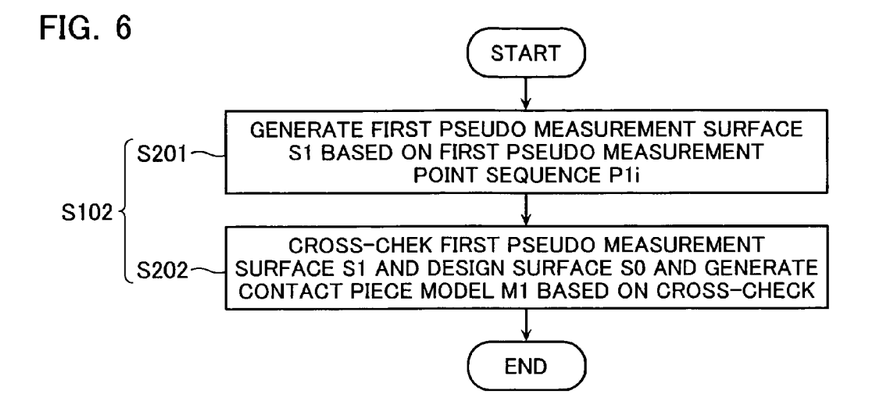
FIG. 6 is a flowchart showing the process of step S102 of FIG. 4.
Figure 7:
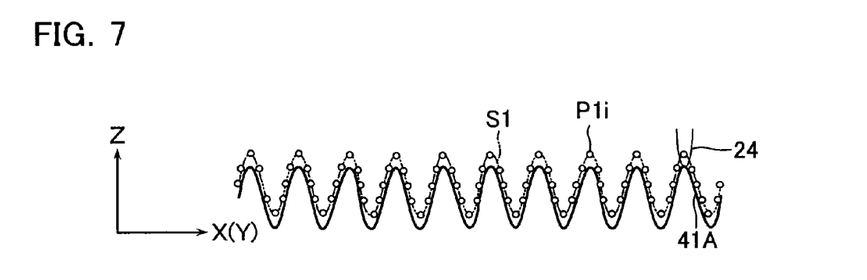
FIG. 7 is a schematic diagram showing the process of step S201 of FIG. 6.

Next, with reference to the flowchart shown in FIG. 6, step S102 described above will be explained in detail. Here, an example in which the "simplified model" shown in FIG. 5 ($a$) is used will be described. Subsequent to step S101, the control unit 51 generates a first pseudo measurement surface S1 based on the first pseudo measurement point sequence P1$i$ of the reference workpiece 4A (step S201). The surface 41A of the reference workpiece 4A has irregularities in a certain direction at a certain pitch as shown in FIG. 7. Hence, the pseudo measurement point sequence P1$i$ obtained by the measurement is distributed in an irregular shape with a certain distance from the surface 41A. The first pseudo measurement surface S1 is expressed by a surface that links these points in the first pseudo measurement point sequence P1$i$ together.

Figure 8:
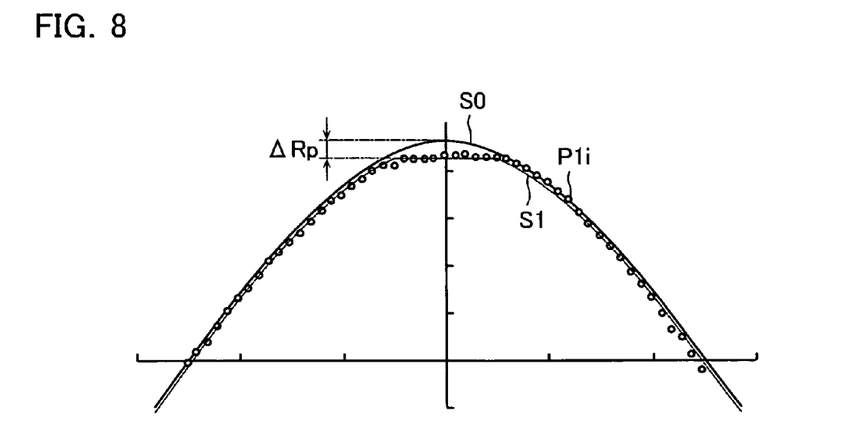
FIG. 8 is a schematic diagram showing the process of step S202 of FIG. 6.

Subsequent to step S201, the control unit 51 cross-checks the first pseudo measurement surface S1 and the design surface S0 of the reference workpiece 4A as shown in FIG. 8 to generate the contact piece model M1 (step S202). If the tip of the contact piece 24 is deformed, the contact piece 24 draws a curve that is gapped from a curve that would be obtained when the tip shape is intact. By knowing the amount ΔRp of the gap, it is possible to generate the contact piece model M1. With this, the control unit 51 completes the process of step S102.

Figure 9:
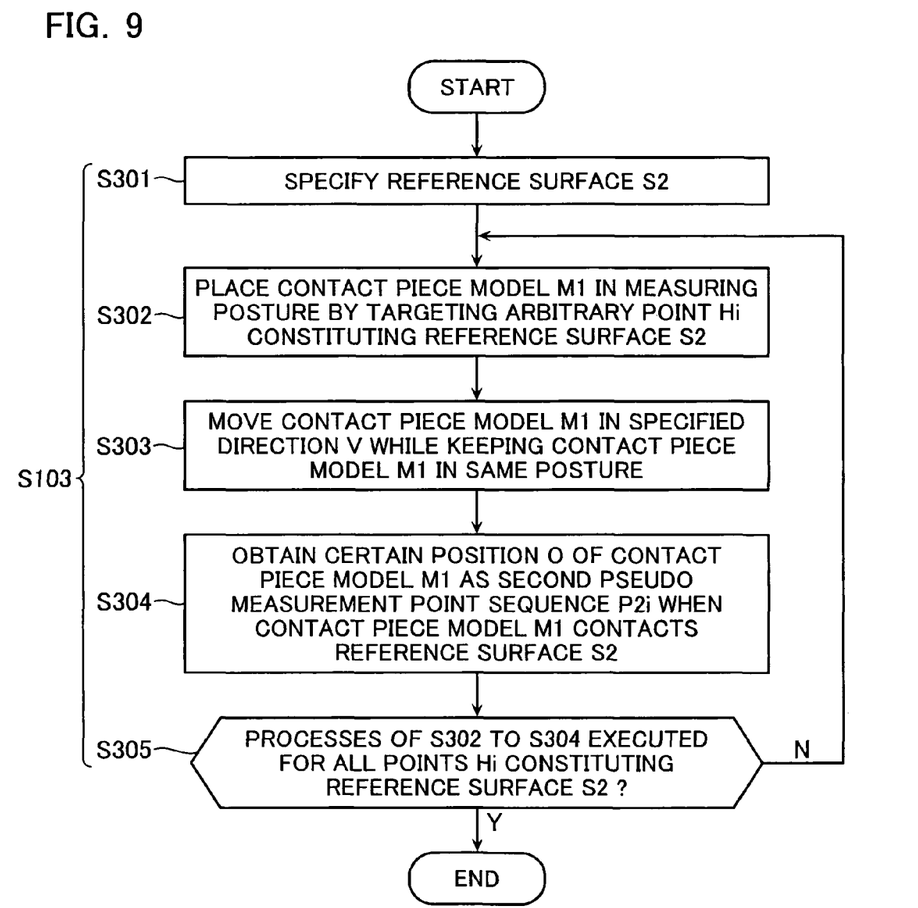
FIG. 9 is a flowchart showing the process of step S103 of FIG. 4.
Figure 10:
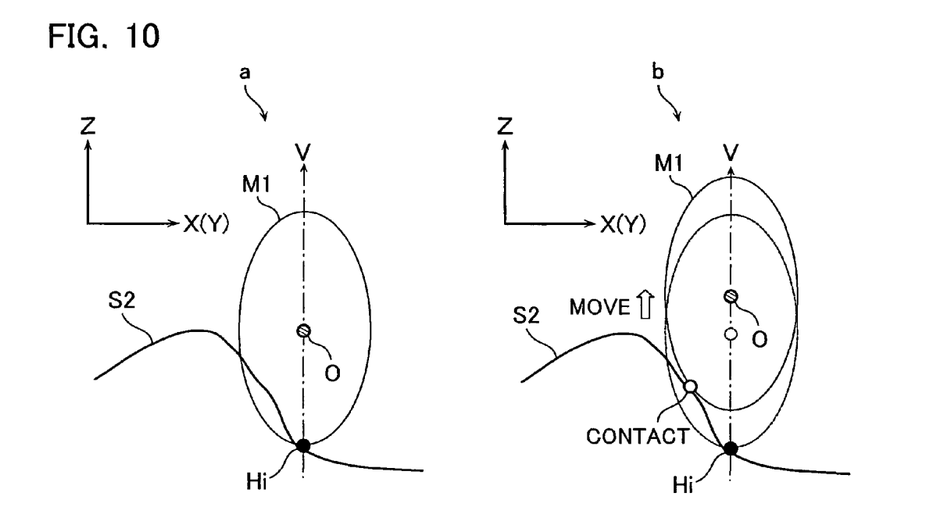
FIG. 10 is a schematic diagram showing the processes of steps S302 to S304 of FIG. 9.

Next, with reference to the flowchart of FIG. 9, step S103 described above will be explained in detail. The control unit 51 receives information from the keyboard and mouse, and specifies the reference surface S2 of the workpiece 4 (step S301). Then, by targeting an arbitrary point Hi that constitutes the reference surface S2, the control unit 51 places the contact piece model M1 at a specified position in a measuring posture in which the contact piece carries out measurement (step S302). For example, the specified position is where the surface of the contact piece model M1 intersects with the point Hi as shown in FIG. 10 ($a$).

Next, the control unit 51 moves the contact piece model M1 in a specified direction V while keeping the contact piece model M1 in the same posture (step S303). Here, the specified direction V is a direction parallel with the Z-axis as shown in FIG. 10 ($b$). Then, by moving the contact piece model M1 in the specified direction V, the control unit 51 finds a position at which the contact piece model M1 contacts the reference surface S2. The control unit 51 obtains a reference position (e.g., center position) O of the contact piece model M1 at this moment as a second pseudo measurement point sequence P2$i$ (step S304). Next, the control unit 51 determines whether or not the processes of step S302 to step S304 have been executed for all the points Hi that constitute the reference surface S2 (step S305). In a case where it is determined that the processes of step S302 to step S304 have not been executed for all the points Hi constituting the reference surface S2 (step S305; N), the control unit 51 executes the processes of step S302 to step S304 again. On the other hand, in a case where it is determined that the processes of step S302 to step S304 have been executed for all the points Hi constituting the reference surface S2 (step S305; Y), the control unit 51 terminates this loop.

Figure 11:
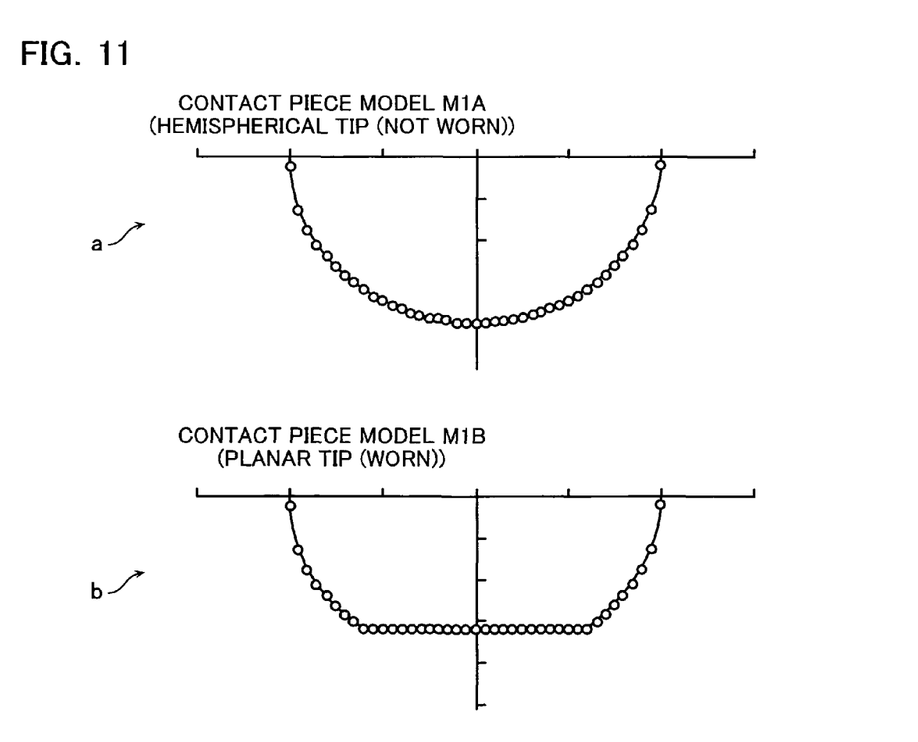
FIG. 11 is a diagram showing contact piece models M1A and M1B.

Next, with reference to FIG. 11 to FIG. 13, step S104 described above will be explained in detail. FIG. 11 is a diagram showing contact piece models M1A and M1B. As shown in FIG. 11 (a), the tip of the contact piece model M1A has a hemispherical shape representing that the tip is not worn. As shown in FIG. 11 (b), the tip of the contact piece model M1B has a planar shape representing that the tip is worn.

Figure 12:
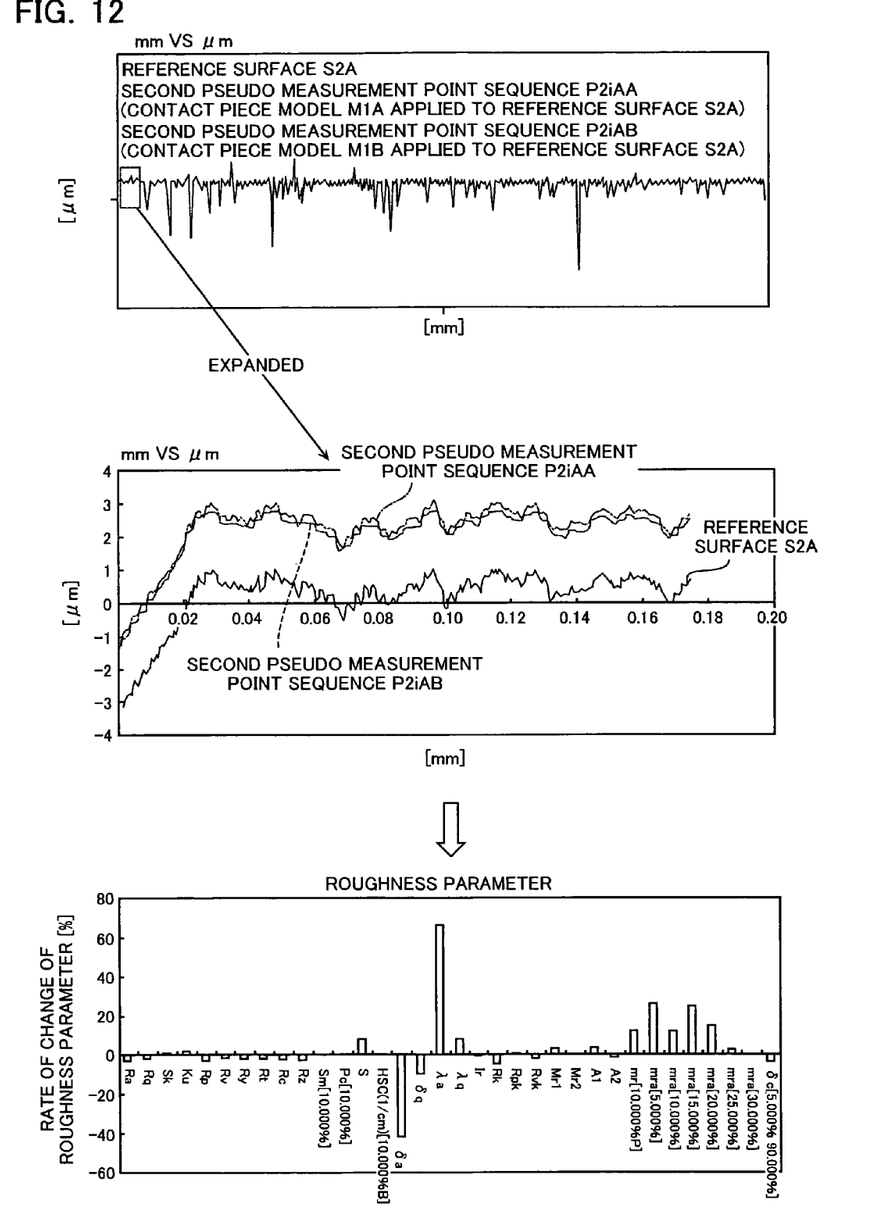
FIG. 12 is a diagram showing a reference surface S2A, second pseudo measurement point sequences P2$i$AA and P2$i$AB, and a rate of change between roughness parameters of the sequences.

FIG. 12 shows a reference surface S2A having a certain surface texture, and second pseudo measurement point sequences P2iAA and P2iAB which are generated by applying the contact piece models M1A and M1B to the reference surface S2A. Furthermore, FIG. 12 shows a rate of change of roughness parameter obtained when a roughness parameter based on the second pseudo measurement point sequence P2iAA changes to a roughness parameter based on the second pseudo measurement point sequence P2iAB (obtained when the tip of the contact piece 24 wears away from a hemispherical shape to a planar shape), where the target is the reference surface S2A.

Figure 13:
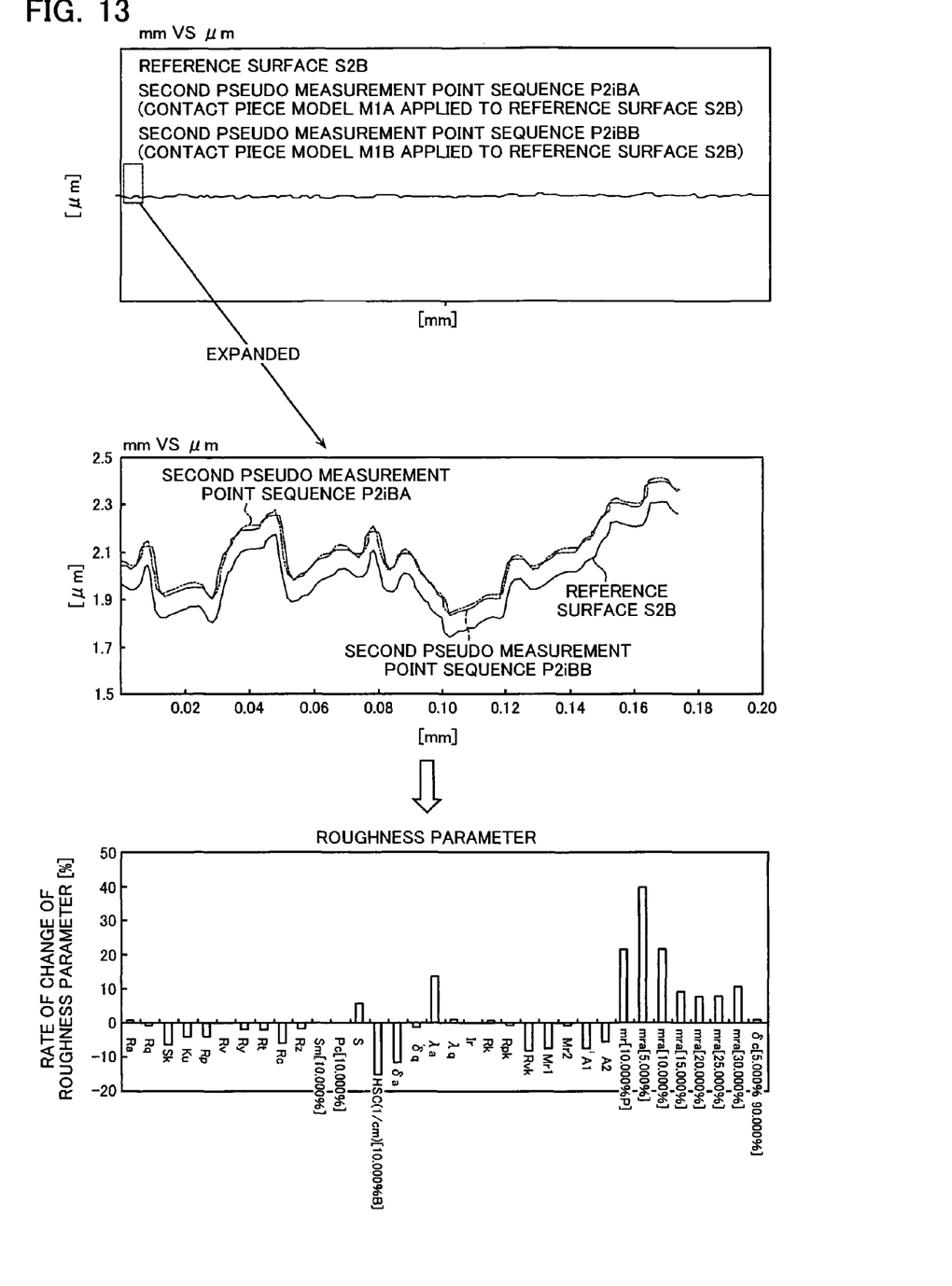
FIG. 13 is a diagram showing a reference surface S2B, second pseudo measurement point sequences P2$i$BA and P2$i$BB, and a rate of change between roughness parameters of the sequences.
Figure 14:
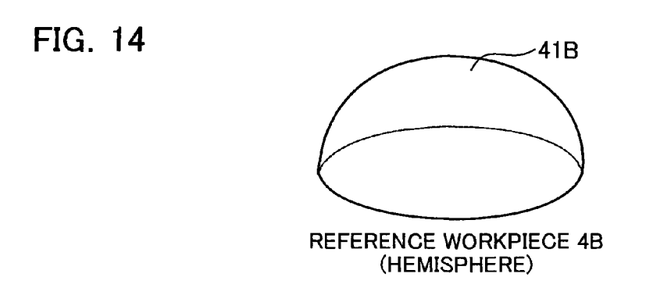
FIG. 14 is a perspective diagram showing a reference workpiece 4B in a second embodiment.

FIG. 13 shows a reference surface S2B, and second pseudo measurement point sequences P2iBA and P2iBB which are generated by applying the contact piece models M1A and M1B to the reference surface S2B. The reference surface S2B has a surface texture different from the reference surface S2A, and is formed less irregular than the reference surface S2A. FIG. 13 also shows a rate of change of roughness parameter obtained when a roughness parameter based on the second pseudo measurement point sequence P2iBA changes to a roughness parameter based on the second pseudo measurement point sequence P2iBB (obtained when the tip of the contact piece 24 wears away from a hemispherical shape to a planar shape), where the target is the reference surface S2B.

As shown in FIG. 11 to FIG. 13, roughness parameter changes along with change of the shape of the contact piece model M1 (M1A, M1B). The rate of change of roughness parameter fluctuates depending on the surface texture of the reference surface S2 (S2A, S2B). In step S104, the control unit 51 uses this roughness parameter as an evaluation value D. For example, when the target is the reference surface S2A shown in FIG. 12, the control unit 51 uses a roughness parameter "λa" that has the largest rate of change as the evaluation value D. When the target is the reference surface S2B shown in FIG. 13, the control unit 51 uses a roughness parameter "mra [5.000%]" that has the largest rate of change as the evaluation value D.

Advantages of Surface Texture Measuring Device According to First Embodiment

In the surface texture measuring device according to the first embodiment, the control unit 51 executes replacement determination for the contact piece 24 in the way described above by generating a contact piece model M1 by measuring the reference workpiece 4A, generating, based on the contact piece model M1, a second pseudo measurement point sequence P2i that is obtained when measuring the reference surface S2 that corresponds to an actual measurement surface, and calculating an evaluation value D based on the second pseudo measurement point sequence P2i.

Therefore, the surface texture measuring device according to the first embodiment can determine whether or not the tip shape of the contact piece 24 is appropriate for the workpiece 4 that is to be actually measured. That is, the surface texture measuring device according to the first embodiment can execute replacement determination with high accuracy.

Second Embodiment

Operation of Surface Texture Measuring Device According to Second Embodiment

Next, an operation of the surface texture measuring device according to the second embodiment will be explained. The surface texture measuring device according to the second embodiment executes a process that uses a method of generating "a detailed model" in step S102 shown in FIG. 4.

In the second embodiment, a hemispherical reference workpiece 4B shown in FIG. 13 will be used instead of the reference workpiece 4A having an irregular surface of the first embodiment.

Figure 15:
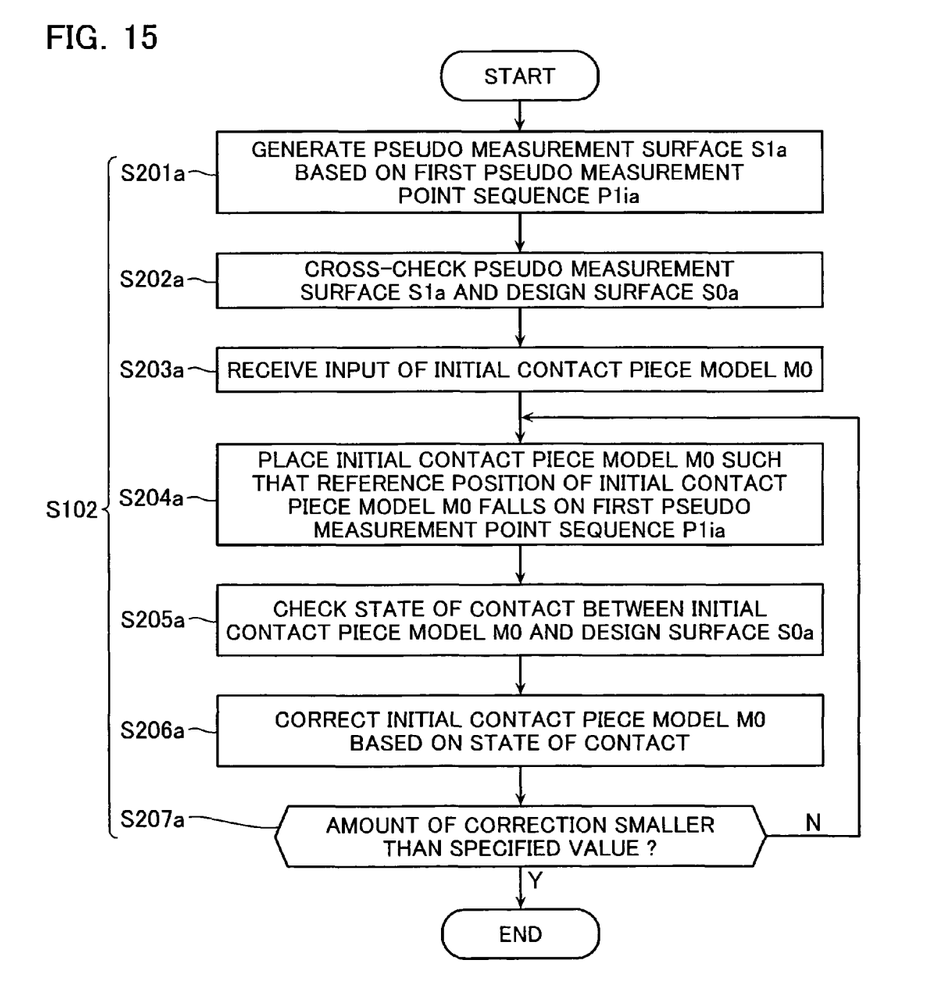
FIG. 15 is a flowchart showing the process of step S102 of FIG. 4 according to the second embodiment.
Figure 16:
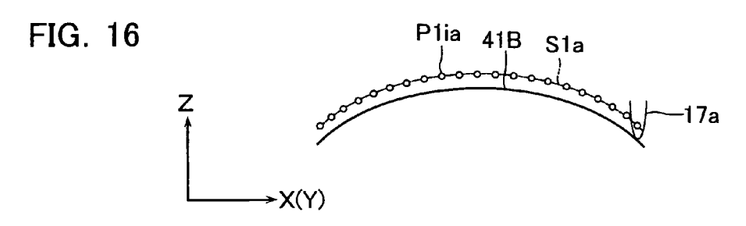
FIG. 16 is a schematic diagram showing the process of step S201$a$ of FIG. 15.

Next, with reference to the flowchart of FIG. 15, step S102 according to the second embodiment using the reference workpiece 4B will be explained in detail. The control unit 51 generates a pseudo measurement surface S1a based on a first pseudo measurement point sequence P1ia of the reference workpiece 4B (step S201a). Here, the surface 41B of the reference workpiece 4B is hemispherical as shown in FIG. 16. Therefore, the first pseudo measurement point sequence P1ia obtained by the measurement is distributed in a hemispherical shape with a certain distance from the surface 41B. The pseudo measurement surface S1a is expressed by a surface that links these points in the first pseudo measurement point sequence P1ia together.

Subsequent to step S201a, the control unit 51 cross-checks the pseudo measurement surface S1a and a design surface S0a of the reference workpiece 4B (step S202a). Next, the control unit 51 receives an input of an initial contact piece model M0 (step S203a). Then, the control unit 51 places the initial contact piece model M0 such that a reference position of the initial contact piece model M0 falls on the first pseudo measurement point sequence P1ia (step S204a). Next, the control unit 51 checks the state of contact between the initial contact piece model M0 and the design surface S0a of the reference workpiece 4B (step S205a).

Figure 17:
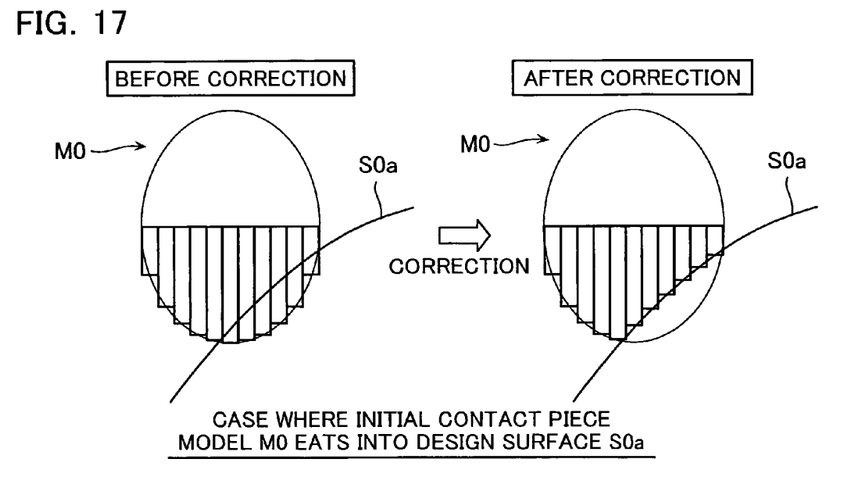
FIG. 17 is a schematic diagram showing the process of step S206$a$ of FIG. 15.
Figure 18:
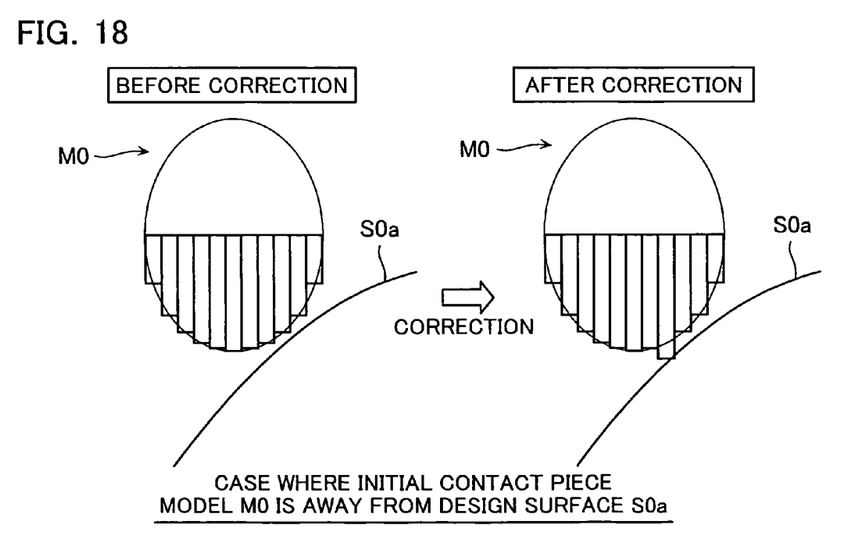
FIG. 18 is a schematic diagram showing the process of step S206$a$ of FIG. 15.

Then, the control unit 51 corrects the initial contact piece model M0 based on the state of contact (step S206a). Here, in a case where the initial contact piece model M0 eats into the design surface S0a as shown in FIG. 17, the control unit 51 corrects the initial contact piece model M0 to be dented to contact the design surface S0a. In a case where the initial contact piece model M0 is away from the design surface S0a as shown in FIG. 18, the control unit 51 corrects the initial contact piece model M0 to project to contact the design surface S0a.

Subsequent to step S206a, the control unit 51 determines whether or not the amount of correction is smaller than a specified value (step S207a). In a case where it is determined that the amount of correction is not smaller than the specified value (step S207a; N), the control unit 51 executes the processes of step S204a to step S206a again. On the other hand, in a case where it is determined that the amount of correction is smaller than the specified value (step S207a; Y), the control unit 51 terminates this process.

Advantages of Surface Texture Measuring Device According to Second Embodiment

The surface texture measuring device according to the second embodiment generates a contact piece model M1 by correcting the initial contact piece model M0 plural times.

Therefore, the surface texture measuring device according to the second embodiment can generate a contact piece model M1 more accurately than the first embodiment, and hence execute replacement determination more accurately than the first embodiment.

Other Embodiments

Though the embodiments of the surface texture measuring device having been explained, the present invention is not limited to the embodiments described above, but various alterations, additions, substitutions, etc. are possible within the scope of spirit of the invention. For example, the present invention can also be applied to a profile measuring device.

What is claimed is:

1. A surface texture measuring device, comprising:
a contact piece having a tip capable of contacting with an actual measuring target;
first pseudo measurement point sequence obtaining means operative to drive the contact piece such that the contact piece traces a surface of a reference workpiece having a reference shape, and obtain a locus of a certain position of the contact piece as a first pseudo measurement point sequence;
contact piece model calculating means operative to calculate, based on the first pseudo measurement point sequence and a design surface specifying the surface of the reference workpiece, a contact piece model representing a surface shape of the contact piece and placed in a pseudo space;
second pseudo measurement point sequence obtaining means operative to place the contact piece model such that a surface of the contact piece model contacts a reference surface specifying a surface of the actual measuring target and that the contact piece model takes a same posture as that taken by the contact piece during a measurement, and calculate a reference position of the contact piece model as a second pseudo measurement point sequence; and
replacement determination means operative to determine whether or not to replace the contact piece based on the second pseudo measurement point sequence.

2. The surface texture measuring device according to claim 1, wherein the replacement determination means calculates a roughness parameter by using the second pseudo measurement point sequence, and determines whether or not to replace the contact piece based on the roughness parameter.

3. The surface texture measuring device according to claim 1, wherein the contact piece model calculating means generates a first pseudo measurement surface expressed by a surface linking the first pseudo measurement point sequence, and generates the contact piece model by cross-checking the first pseudo measurement surface and the design surface.

4. The surface texture measuring device according to claim 1, wherein the contact piece model calculating means generates a pseudo measurement surface expressed by a surface linking the first pseudo measurement point sequence, cross-checks the pseudo measurement surface and the design surface, receives an input of the contact piece model, places the contact piece model such that the reference position thereof falls on the first pseudo measurement point sequence, and corrects the contact piece model based on a state of contact between the contact piece model and the design surface.

5. The surface texture measuring device according to claim 1, wherein the second pseudo measurement point sequence obtaining means places the contact piece model in a measuring posture by targeting an arbitrary point constituting the reference surface, moves the contact piece model in a specified direction while keeping the contact piece model in that posture, and obtains the reference position as the second pseudo measurement point sequence when the contact piece model contacts the reference surface.

6. The surface texture measuring device according to claim 1, wherein the reference workpiece has a surface having irregularities in a certain direction at a certain pitch, or a hemispherical surface.

7. A surface texture measuring method involving use of a contact piece having a tip capable of contacting with an actual measuring target, the method comprising:
driving the contact piece such that the contact piece traces a surface of a reference workpiece having a reference shape, and obtaining a locus of a certain position of the contact piece as a first pseudo measurement point sequence;
calculating, based on the first pseudo measurement point sequence and a design surface specifying the surface of the reference workpiece, a contact piece model representing a surface shape of the contact piece and placed in a pseudo space;
placing the contact piece model such that a surface of the contact piece model contacts a reference surface specifying a surface of the actual measuring target and that the contact piece model takes a same posture as that taken by the contact piece during a measurement, and calculating a reference position of the contact piece model as a second pseudo measurement point sequence; and
determining whether or not to replace the contact piece based on the second pseudo measurement point sequence.

8. The surface texture measuring method according to claim 7, comprising: calculating a roughness parameter by using the second pseudo measurement point sequence; and determining whether or not to replace the contact piece based on the roughness parameter.

9. The surface texture measuring method according to claim 7, comprising: generating a first pseudo measurement surface expressed by a surface linking the first pseudo measurement point sequence; and generating the contact piece model by cross-checking the first pseudo measurement surface and the design surface.

10. The surface texture measuring method according to claim 7, comprising: generating a pseudo measurement surface expressed by a surface linking the first pseudo measurement point sequence; cross-checking the pseudo measurement surface and the design surface; receiving an input of the contact piece model; placing the contact piece model such that the reference position thereof falls on the first pseudo measurement point sequence; and correcting the contact piece model based on a state of contact between the contact piece model and the design surface.

11. The surface texture measuring method according to claim 7, comprising: placing the contact piece model in a measuring posture by targeting an arbitrary point constituting the reference surface; moving the contact piece model in a specified direction while keeping the contact piece model in that posture; and obtaining the reference position as the second pseudo measurement point sequence when the contact piece model contacts the reference surface.

12. The surface texture measuring method according to claim 7, wherein the reference workpiece has a surface having irregularities in a certain direction at a certain pitch, or a hemispherical surface.

13. A surface texture measuring program, stored on a computer readable storage medium, involving use of a contact piece having a tip capable of contacting with an actual measuring target, the program controlling a computer to:

drive the contact piece such that the contact piece traces a surface of a reference workpiece having a reference shape, and obtain a locus of a certain position of the contact piece as a first pseudo measurement point sequence;

calculate, based on the first pseudo measurement point sequence and a design surface specifying the surface of the reference workpiece, a contact piece model representing a surface shape of the contact piece and placed in a pseudo space;

place the contact piece model such that a surface of the contact piece model contacts a reference surface specifying a surface of the actual measuring target and that the contact piece model takes a same posture as that taken by the contact piece during a measurement, and calculate a reference position of the contact piece model as a second pseudo measurement point sequence; and     determine whether or not to replace the contact piece based on the second pseudo measurement point sequence.

14. The surface texture measuring program according to claim 13, controlling the computer to: calculate a roughness parameter by using the second pseudo measurement point sequence; and determine whether or not to replace the contact piece based on the roughness parameter.

15. The surface texture measuring program according to claim 13, controlling the computer to: generate a first pseudo measurement surface expressed by a surface linking the first pseudo measurement point sequence; and generate the contact piece model by cross-checking the first pseudo measurement surface and the design surface.

16. The surface texture measuring program according to claim 13, controlling the computer to: generate a pseudo measurement surface expressed by a surface linking the first pseudo measurement point sequence; cross-check the pseudo measurement surface and the design surface; receive an input of the contact piece model; place the contact piece model such that the reference position thereof falls on the first pseudo measurement point sequence; and correct the contact piece model based on a state of contact between the contact piece model and the design surface.

17. The surface texture measuring program according to claim 13, controlling the computer to: place the contact piece model in a measuring posture by targeting an arbitrary point constituting the reference surface; move the contact piece model in a specified direction while keeping the contact piece model in that posture; and obtain the reference position as the second pseudo measurement point sequence when the contact piece model contacts the reference surface.

18. The surface texture measuring program according to claim 13, wherein the reference workpiece has a surface having irregularities in a certain direction at a certain pitch, or a hemispherical surface.

\* \* \* \* \*